United States Patent [19]
Rechenberg

[11] Patent Number: 5,407,235
[45] Date of Patent: Apr. 18, 1995

[54] BEARING SEAL FOR AXLES

[75] Inventor: Winfried Rechenberg, Hilden, Germany

[73] Assignee: Mannesmann Aktiengesellschaft, Dusseldorf, Germany

[21] Appl. No.: 148,467

[22] Filed: Nov. 5, 1993

[30] Foreign Application Priority Data

Nov. 13, 1992 [DE] Germany .................. 42 38 958.5

[51] Int. Cl.6 ............................................. F16C 33/74
[52] U.S. Cl. ........................................ 384/130; 277/53
[58] Field of Search ........ 384/130, 142, 144, 149–153; 277/53, 83, 173, 184

[56] References Cited

U.S. PATENT DOCUMENTS

| 2,058,143 | 10/1936 | Flanders | 384/130 X |
| 2,622,449 | 12/1952 | Barker | 384/130 X |
| 3,942,849 | 3/1976 | Doyle et al. | 384/144 X |
| 4,101,180 | 7/1978 | Anderson et al. | 277/53 X |

Primary Examiner—Thomas R. Hannon
Attorney, Agent, or Firm—Cohen, Pontani, Lieberman, Pavane

[57] ABSTRACT

A bearing seal for axles, in particular the seal of a grease-lubricated sliding bearing for a pin. A sealing ring which is arranged on the axle via a press fit is provided in the bearing housing and a retaining ring is arranged in an annular groove for the sealing ring.

9 Claims, 2 Drawing Sheets

BEARING SEAL FOR AXLES

BACKGROUND OF THE INVENTION

1. Field of the Invention

The invention is directed to a bearing seal for axles, in particular the seal of a grease-lubricated sliding bearing for a pin.

2. Description of the Prior Art

Radial shaft sealing rings having a sealing ring with a sealing lip contacting the shaft and a spring which is tensioned around the outside of the sealing ring are known in general from the prior art. The sealing ring is arranged so as to be centered in an annular groove of a bearing bore hole of the bearing housing. Play existing between the shaft and the bearings is bridged by way of the elasticity of the sealing lip and the pretensioning of the sealing ring via the spring.

Use of these radial shaft sealing rings for sealing grease-lubricated pin bearings, which are used e.g. in the booms of excavators, proves disadvantageous since the play of the pin connection conditioned by its design already lies within the limiting range of the maximum play of a shaft sealing ring which can be compensated for. The decreased wear of the pin suspension brought about by an increase in play has the inevitable result that the sealing lip of the shaft sealing ring can no longer bridge the bearing play so that the dirt penetrating into the bearing leads to a drastic increase in wear.

A bearing seal, preferably a sliding bearing seal, for bearings exposed to high wear, as is the case in roller tables in rolling mills, is known from DD 14 251. This bearing seal has a sealing means which slides on the shaft and embraces it. The annular sealing means is held by its outer circumference in an annular groove of a ring. The ring with the sealing means is arranged so as to slide radially with a sliding fit within another groove arranged in the bearing bore hole of the bearing housing. Further, the ring is guided in the groove of the bearing housing by pins which are disposed axially and engaged in radially directed grooves in the side walls of the ring. The pins secure the ring with the sealing means so as to prevent rotation in the bearing housing.

This bearing seal has proven very costly in terms of construction in that the sealing element is constructed from two parts, the ring and the sealing means, and because the ring must have additional radially directed grooves for the pins in order to secure the sealing means against rotation.

SUMMARY OF THE INVENTION

Accordingly, it is an object of the present invention to provide a bearing seal for axles, in particular a reliable sealing of a grease-lubricated sliding bearing for a pin, which has a compact and simple construction as well as a long useful life.

Pursuant to this object, and others which will become hereafter, one aspect of the present invention resides in a bearing seal for axles, in particular a seal of a grease-lubricated sliding bearing for a pin, in which a sealing ring embraces the axle and is guided with radial play so as to slide in an annular groove arranged in the bearing housing. A retaining ring for the sealing ring is inserted in an annular recess which is open on one side when viewed in the longitudinal direction of the axle. The retaining ring and the annular recess together form the annular groove in the bearing housing.

In another embodiment of the invention the retaining ring is fastened in the annular recess by an expansion press fit engagement.

In still another embodiment of the invention the retaining ring has an inner diameter which is greater than the outer diameter of the axle by an amount which corresponds to the maximum allowable play of the beating.

In a further embodiment of the invention the retaining ring is made of bearing bronze.

In still a further embodiment of the invention the retaining ring has a laterally arranged shoulder which is directed toward the center of the bearing housing. The shoulder has the same outer diameter as the retaining ring while the width of the retaining ring in the region of the shoulder corresponds to the depth of the annular recess.

In yet another embodiment, the sealing ring is arranged between the retaining ring and a wall of the bearing housing which define the recess with slight play in the manner of a sliding or bearing fit.

In an additional embodiment of the invention the sealing ring and the annular groove each have a rectangular cross section. The surfaces facing the longitudinal direction of the axle define the long sides of the rectangular cross sections.

In another embodiment of the invention the sealing ring is provided with at least one radially aligned lubrication groove in its surfaces which are guided in the annular groove.

By arranging the sealing ring on the axle via a press fit, the bearing seal according to the invention achieves a faultless seal between the axle and the sealing ring. Also, as a result of this arrangement of the sealing ring on the axle whereby the sealing ring is fixed with respect to rotation relative to the axle, it avoids costly means for securing the sealing ring against rotation in the groove of the bearing housing. Such seals are particularly suitable for the bearing support of pins which execute only swiveling movements and slow rotational movements. This is the type of load sustained by the pin connections between the boom parts of an excavator. Since the annular groove for the sealing ring is formed by a retaining ring inserted in an annular recess of the bearing housing which is open on one side, the seal can be mounted in a particularly advantageous manner because this seal can accordingly be slid over the axle laterally into the recess and the retaining ring can only then be inserted.

It is particularly advantageous that the dimensions of the retaining ring and sealing ring are very compact and accordingly correspond to those of commercially available shaft sealing rings. Thus, these conventional sealing rings may be replaced by the bearing seal according to the invention.

The fastening of the retaining ring via an expansion press fit engagement in the recess results in a simple construction of the retaining ring. The inner diameter of the retaining ring, which is greater than the outer diameter of the axle by an amount corresponding to the maximum allowable play of the bearing, ensures that the retaining ring will not slip on the axle due to bearing shell wear. Moreover, the retaining ring which is dimensioned in this way also offers an adequate supporting/sealing surface for the sealing ring contacting it. The use of bearing bronze as a material for producing the retaining ring proves advantageous in that the axle is not damaged by the retaining ring in the event of unforeseen wear or destruction of the bearing shell. The retaining ring is provided with an annular projection or shoulder facing in the direction of the interior of the bearing housing so that the retaining ring has an L-shaped contour in cross section and the legs of the retaining ring define the annular groove. The width of the retaining ring in the region of the shoulder is dimensioned so as to correspond to the depth of the recess.

Consequently, it is possible to install the seal in the bearing housing in a particularly simple manner, since a pre-defined width of the annular groove is obtained when the shoulder abuts at the inner wall of the recess. This ensures that the sealing ring is installed in a sliding fit or bearing fit favoring the sealing effect. Due to its good sliding properties, the use of PTFE as a material for producing the sealing ring also enables an emergency sealing in the event of leakage of grease lubricant. Additionally, the sealing ring is provided laterally with at least one radially aligned lubrication groove so that lubricating grease is purposefully routed between the sealing ring and the inner wall of the recess and between the sealing ring and the inner wall of the retaining ring.

The invention is explained in more detail in the following with reference to a seal for a grease-lubricated sliding bearing of a pin.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
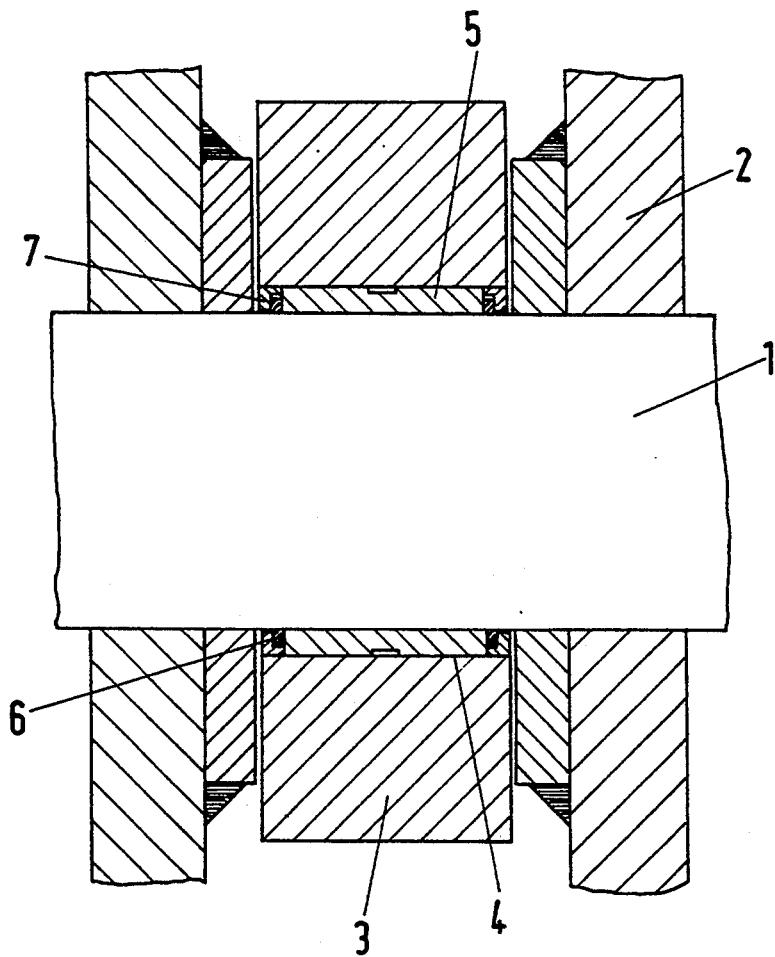
FIG. 1 shows a longitudinal section through a pin suspension.

FIG. 1 shows a longitudinal section through a grease-lubricated sliding bearing 5 of an axle 1 which is constructed in particular as a pin. Such pin connections are used, for example, in excavators for connecting the parts of a boom which are swivelable relative to one another. The axle 1 is supported in the region of its ends in the bore holes of a fork 2 so as to be fixed with respect to rotation relative to the fork. The fork 2 is a component part of a boom part which is not shown. A bearing housing 3 which is constructed as a bracket and has a bearing bore hole 4 is arranged between the cheeks of the fork 2. The bracket belongs to another boom part, also not shown in the drawing. A sliding bearing 5 for the axle 1 is slid into the bearing bore hole 4. Seals which are flush with the side wall of the bearing housing 3 are provided at the ends of the bearing bore hole 4. The seal includes a sealing ring 6 and a retaining ring 7.

Figure 2:
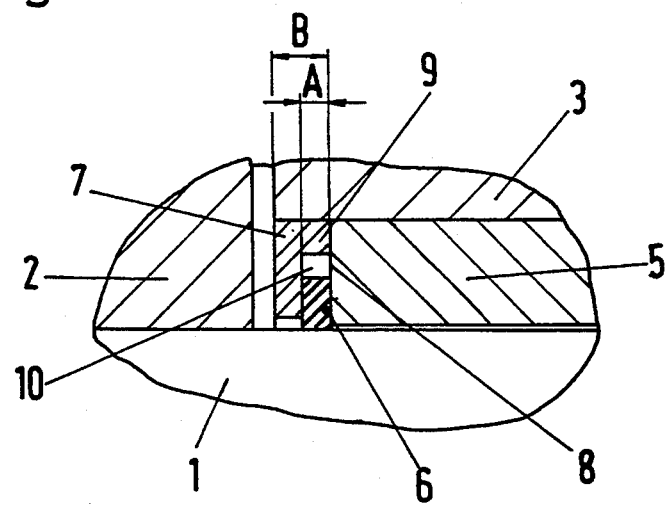
FIG. 2 shows an enlarged section from FIG. 1 of the region of the seal.

FIG. 2 shows an enlarged section from FIG. 1 in the region of the seal. It can be seen that the bearing housing 3 and the sliding beating 5 inserted therein define an annular recess 8 in the front end region of the bearing bore hole 4. The retaining ring 7 is constructed in an L-shaped manner as seen in cross section and has a shoulder 9 facing in the direction of the sliding bearing 5 and the interior of the bearing housing 3. The shoulder 9 forms the short leg of the L-shaped retaining ring 7. In the installed state, the legs of the retaining ring 7 define an annular groove 10 on the outside as well as in the radial and axial direction. Moreover, defining surfaces of the annular groove 10 are formed by the end wall of the sliding bearing 5 facing out of the bearing housing 3 and by the surface of the axle 1. The sealing ring 6, which is slid onto the axle 1 so as to be fixed with respect to rotation relative thereto, is arranged in the annular groove 10. In this context, fixed with respect to rotation means that the inner diameter of the sealing ring 6 is underdimensioned relative to the outer diameter of the axle 1. The sealing ring 6 fits in the annular groove 10 with slight lateral play in the manner of a sliding fit or bearing fit. As viewed in the radial direction, the annular groove is not completely filled by the sealing ring 6, so that the sealing ring 6 can slide in the radial direction between the sliding bearing 5 and the retaining ring 7. This open portion of the annular groove 10 is filled with grease in the operating state.

Further, it can be seen from this drawing that the inner diameter of the retaining ring 7 is larger than the outer diameter of the axle 1 so that there is play between these structural component parts. This play corresponds roughly to the maximum allowable play of the pin suspension brought about by wear of the sliding bearing 5. The width B of the retaining ring 7 in the region of its shoulder 9 corresponds to the depth of the recess 8, so that the outer surface of the retaining ring 7 is flush with the lateral surface of the bearing housing 3 in the installed state. Moreover, the width A of the shoulder 9 is selected so as to achieve the dimension for the desired installation fit for the sealing ring 6 in the installed state of the retaining ring 7.

Figure 3:
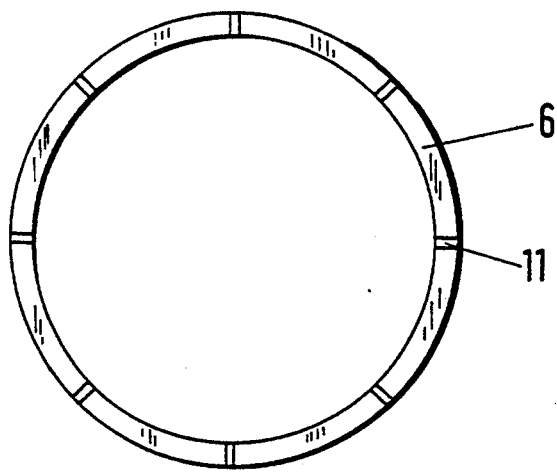
FIG. 3 shows a view of a sealing ring.

FIG. 3 shows a sealing ring 6 with a plurality of lubrication grooves 11. The lubrication grooves 11 are arranged at the front side and the rear side of the sealing ring 6 as seen in the axial direction and are aligned in the radial direction so that the inner surface of the sealing ring 6 is connected with its outer surface. The lubrication grooves 11 are alternately offset relative to one another and are arranged so as to be uniformly distributed along the circumference of tile sealing ring 6.

Figure 4:
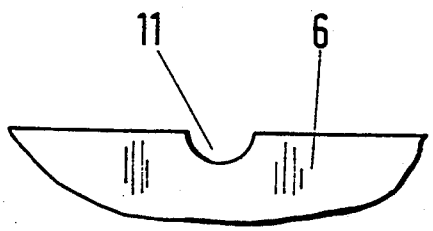
FIG. 4 shows an enlarged section from the region of a lubrication groove from FIG. 3.

FIG. 4 shows an enlarged section of the sealing ring 6 in the region of a lubrication groove 11. It can be seen that the semicircular lubrication groove 11 connects the outer surface of the sealing ring 6 with its inner surface.

The invention is not limited by tile embodiments described above which are presented as examples only but can be modified ill various ways within the scope of protection defined by the appended patent claims.

I claim:

1. A bearing seal for an axle, comprising:
   a bearing;
   a bearing housing that surrounds said bearing and forms an annular recess therewith that is open on one side as seen in a longitudinal direction of the axle;
   a retaining ring provided in the annular recess so as to define an annular groove; and
   a sealing ring fixed to the axle with a pressed fit so as to embrace the axle, be guided with radial play and be slidable in the annual groove.

2. A bearing seal according to claim 1, wherein the retaining ring is fastened in the annular recess by an expansion press fit engagement.

3. A bearing seal according to claim 1, wherein the axle has an outer diameter, the retaining ring having an inner diameter which is greater than the outer diameter of the axle by an amount corresponding to a maximum allowable play of the bearing.

4. A bearing seal according to claim 1, wherein the retaining ring is made of bearing bronze.

5. A bearing seal according to claim 1, wherein the retaining ring has a laterally arranged shoulder that is directed toward a center of the bearing housing and has a common outer diameter with the retaining ring, the retaining ring having a width in a region of the shoulder which corresponds to a depth of the annular recess as seen in the longitudinal direction of the axle.

6. A bearing seal according to 1, wherein the sealing ring is arranged between the retaining ring and a wall of the bearing housing which define the recess with slight play in one of a sliding and a bearing fit.

7. A bearing seal according to claim 1, wherein the sealing ring and the annual groove each have a rectangular cross section, which rectangular cross-section has long sides which are defined by surfaces of the sealing ring and the annular groove that face in the longitudinal direction of the axle.

8. A bearing seal according to claim 1, wherein the sealing ring has at least one radially aligned lubrication groove at its axial surfaces guided in the annular groove.

9. A bearing seal according to claim 1, wherein the seal ring is made of PTFE.

* * * * *